United States Patent Office 3,577,238
Patented May 4, 1971

3,577,238
FERROCENE DYES AND PHOTOGRAPHIC ELEMENTS
Jacque K. Lindsay, Rochester, N.Y., assignor to Eastman Kodak Company, Rochester, N.Y.
No Drawing. Filed Mar. 28, 1969, Ser. No. 811,567
Int. Cl. G03c 1/64; G03f 7/10
U.S. Cl. 96—28    9 Claims

ABSTRACT OF THE DISCLOSURE

Light-sensitive ferrocene dyes are prepared by condensing formylferrocene or a vinylog thereof such as formylvinylferrocene with a heterocyclic reagent in an alkaline medium. The dyes so prepared are light-sensitive and operate to harden or tan gelatin upon exposure to light.

---

This invention relates to photography and in particular to light-sensitive ferrocene dyes and their use in photographic elements containing gelatin.

The hardening of gelatin by photocrosslinking generally requires a relatively intense exposure of high energy radiation, for example ultraviolet rays. It is desirable to provide visible-light, infrared and heat promoted gelatin hardening and visible-light, infrared and heat sensitive compounds to promote such hardening or tanning.

Accordingly, it is an object of this invention to provide new ferrocene dyes sensitive to visible light and longer wavelength radiation.

It is another object of the present invention to provide novel photographic elements including gelatin and a ferrocene dye sensitive to visible light and longer radiation.

Yet additional objects and advantages of the instant invention will become apparent from a consideration of the following specification and appended claims.

These and other objects of this invention are accomplished with light-sensitive ferrocene dyes including those having the formulas:

(I)

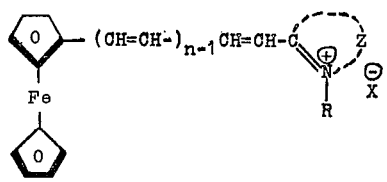

(II)

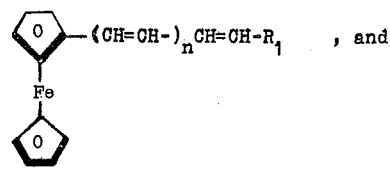
, and (III)

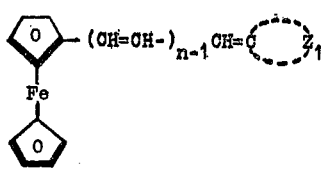

wherein:

(a) Z represents the non-metallic atoms necessary to complete a heterocyclic nucleus having in the heterocylic portion of said nucleus at least one atom selected from either nitrogen, oxygen, selenium or sulfur, (b) $\overset{\ominus}{X}$ represents an anion, (c) R represents an alkyl radical, (d) $R_1$ represents either a pyrylium salt radical or a thiapyrylium salt radical, and (e) $Z_1$ represents the non-metallic atoms necessary to complete a 5 to 6 membered saturated heterocyclic nucleus having in said nucleus 2 hetero atoms selected from either:
  1. 2 nitrogen atoms, or
  2. 1 nitrogen atom and 1 sulfur atom, and (f) $n$ represents a positive integer of from 1 to 3.

The ferrocene dyes of this invention are characterized by an unsaturated side chain optionally having 1 or 2 vinylene radicals as represented herein in which side chain is included a conjugated system that greatly contributes to the light sensitivity of the ferrocene dye. In general, as the length of the constituent methine bridge of the noted side chain increases, the absorption maxima of the ferrocene dye is extended to longer wavelengths, with typical extended absorption maxima ranging into the infrared and heat radiation bands of the spectrum. The unsaturated side chains of the subject ferrocene dye compounds are described both hereinabove and with greater particularity hereinbelow.

In Formula I, the atoms represented by Z can complete a wide variety of heterocyclic nuclei such as an indole nucleus and including members of the benzindole series like benz[e]indole, 3 - alkylbenz[e]indole, 1,3,3, - trimethylbenz[e]indole and naphthoindole series; members of the thiazole series including such as, for example, thiazole, 3-methylthiazole, benzothiazole, and naphthothiazole; members of the oxazole series like 5-methyloxazole, benzoxazole, 5-phenylbenzoxazole, and naphthoxazole; members of the selenazole series such as 4-methylselenazole, 4 - phenylselenazole, benzoselenazole, 5 - chlorobenzoselenazole, α - naphthoselenazole, etc.; members of the 2-pyridine series like 2-pyridine and 5-methyl-2-pyridine; members of the imidazole series such as imidazole, 1 - alkylimidazole, 1 - alkyl - 4 - phenylimidazole, benzimidazole, 1-aryl-5,6-dichlorobenzimidazole, naphthimidazole, 1 - alkyl-5-methoxy-3-naphthimidazole, etc.; members of the 2-quinoline series such as 3-methyl-2-quinoline, 8-ethoxy-2-quinoline, etc. A wide variety of other heterocyclic nuclei can be advantageously utilized.

As noted hereinabove, R represents an alkyl radical which is inclusive of substituted alkyl radicals such as a carboxyalkyl radical. As described herein, and unless otherwise expressed, the terms alkyl and alkoxy refer to optionally substituted, straight and branched chain alkyl and alkoxy radicals having from 1 to about 6 carbon atoms in the alkyl or alkoxy chain. Such radicals include alkyl radicals like methyl, ethyl, propyl, isopropyl, n-butyl, tert-butyl, amyl, hexyl, etc., and alkoxy radicals such as methoxy, ethoxy, propoxy, butoxy, tert-butoxy, amyloxy and the like. The anions represented by X are susceptible of extensive interchange and are conventionally such anions as halide anions like bromide, chloride and iodide as well as additional anions such as p-toluene sulfonate, perchlorate, sulfate, methylsulfonate, fluoroborate, etc.

Especially advantageous ferrocene dyes of this invention and also included within the scope of Formula I are dyes such as, for example:
3-methyl-2-ferrocenylidenemethyl-4,5-dihydrothiazolium iodide,
3-butyl-2-ferrocenylidenemethyl-4,5-dihydrothiazolium iodide, 3-butyl-2-ferrocenylidenemethylbenzothiazolium-
   p-toluene sulfonate,
1,3,3-trimethyl-2-ferrocenylidenemethylbenz[e]in-
   dolium iodide,
3-ethyl-2-ferrocenylidenemethylbenzothiazolium-
   p-toluene sulfonate,
1-methyl-2-ferrocenylidenemethylpyridinium-p-
   toluene sulfonate,
3-methyl-2-ferrocenylidenemethylbenzothiazolium-
   p-toluene sulfonate,
2-ferrocenylidenemethylbenzothiazolium-3-n-
   butyl sulfonate,
3-methyl-2-ferrocenylidenemethylbenzothiazolium
   iodide,
1-ethyl-2-ferrocenylidenemethylquinolinium iodide,
3-ethyl-2-ferrocenylideneprop-1-enylbenzothia-
   zolium bromide,
3-methyl-2-ferrocenylidenepenta-1,3-dienylbenzox-
   azolium iodide.

Of the dyes included within the scope of Formula II appearing hereinabove, advantageous pyrylium and thiapyrylium salt radicals include 2-pyrylium salt radicals having the formula:

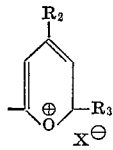

2-thiapyrylium salts having the formula:

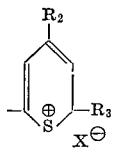

4-pyrylium salt radicals having the formula:

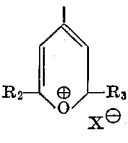

and 4-thiapyrylium salt radicals having the formula:

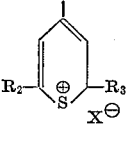

wherein X is an anion as defined elsewhere herein and $R_2$ and $R_3$ each represent an aliphatic group having from 1 to 15 carbon atoms in the aliphatic chain, such as methyl, ethyl, propyl, isopropyl, butyl, tertiary butyl, amyl, isoamyl, hexyl, octyl, nonyl, dodecyl, ethylene, styryl, alkoxystyryl, diethoxystyryl, dimethylaminostyryl, 1-butyl-4-p-dimethylaminophenyl-1,3-butadienyl, β-ethyl - 4 - dimethylaminostyryl; an alkoxy group such as methoxy, ethoxy, propoxy, butoxy, amyloxy, hexoxy, octoxy, etc.; aryl, such as phenyl, 4-biphenyl, alkylphenyl, such as 4-ethylphenyl, 4-propylphenyl, etc., alkoxyphenyl, e.g., 4-ethoxyphenyl, 4-methoxyphenyl, 4-amyloxyphenyl, 2-hexoxyphenyl, 2-methoxyphenyl, 2-amyloxyphenyl, 3,4-dimethoxyphenyl, etc., ω-hydroxyalkoxyphenyl, e.g., 2-hydroxyethoxyphenyl, 3 - hydroxyethoxyphenyl, etc., 4 - hydroxyphenyl, halophenyl, e.g., 3,4-dichlorophenyl, 3,4-dibromophenyl, 4-chlorophenyl, 2,4-dichlorophenyl, etc., azidophenyl, nitrophenyl, etc., aminophenyl, e.g., 4-diethylaminophenyl, 4-dimethylaminophenyl, etc.

Especially advantageous pyrylium and thiapyrylium salt radicals include those 2-pyrylium salt and 2-thiapyrylium salt radicals having the formulas:

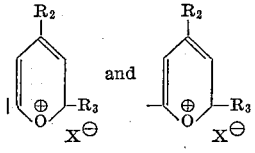

wherein $\overset{\ominus}{X}$ represents an anion as defined hereinabove and each of $R_2$ and $R_3$ represents an aryl radical and preferably a phenyl radical such as phenyl, alkylphenyl, alkoxyphenyl, aminophenyl, etc., as described elsewhere herein.

Exemplary light-sensitive ferrocene dyes having pyrylium salt and thiapyrylium salt radicals substituted thereon include such compounds as:

2,4-diphenyl-6-(β-ferrocenylvinyl)pyrylium
   fluoroborate,
2-(β-ferrocenylvinyl)-4,6-dichlorophenylpyr-
   ylium perchlorate,
2-(β-ferrocenylvinyl)-4-(4-amyloxyphenyl)-6-
   (4-methoxyphenyl)pyrylium sulfate,
2-(β-ferrocenylvinyl)-4-phenyl-6-(4-methoxy-
   phenyl)thiapyrylium fluoroborate,
2-(β-ferrocenylvinyl)-4-phenyl-6-(4-dimethyl-
   aminostyryl)thiapyrylium perchlorate,
2-(β-ferrocenylvinyl)-4-(4-methoxyphenyl)-6-(4-
   ethylphenyl)thiapyrylium chloride,
2,4-diphenyl-6-(4-ferrocenylbuta-1,3-dienyl)pyrylium
   perchlorate, and
2(6-ferrocenylhexa-1,3,5-trienyl)-4,6-di(4-ethylphenyl)
   pyrylium fluoroborate.

Additional pyrylium salt radicals useful herein when condensed with a ferrocenylvinyl radical or its higher vinylogs to form the subject ferrocene dyes include such pyrylium salt radical configurations as can be derived from the pyrylium compounds described in U.S. 3,250,615.

Those ferrocene dyes represented by Formula III are characterized by a side group substituted on the ferrocene nucleus and having the formula

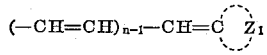

wherein $n$ is as represented elsewhere herein and $Z_1$ represents the nonmetallic atoms necessary to complete a 5 to 6 membered, saturated heterocyclic nucleus having in said nucleus 2 hetero atoms that are either 2 nitrogen atoms or 1 nitrogen atom and 1 sulfur atom. Particularly advantageous nuclei completed by the atoms represented by $Z_1$ include those having the formulas:

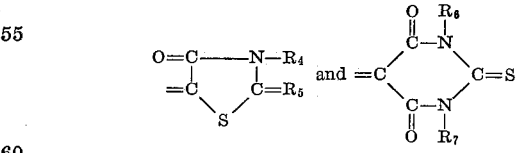

wherein $R_4$ represents an alkyl radical having from 1 to about 16 carbon atoms such as methyl, ethyl, propyl, isobutyl, tert-butyl, amyl, octyl, decyl, dodecyl, cetyl, etc., $R_5$ represents either a thioxo radical or an arylimino radical and each of $R_6$ and $R_7$ represents an alkyl radical such as those described elsewhere herein.

Especially preferred light-sensitive ferrocene dyes of the type included within Formula III are such compounds as:

3-ethyl-5-ferrocenylidene rhodanine,
3-(β-sulfoethyl)-5-ferrocenylidene rhodanine sodium salt,
2-phenylimino-3-cetyl-5-ferrocenylidene-4-thiazolidone,
1,3-diethyl-5-ferrocenylidene-2-thiobarbituric acid,
3-ethyl-5(ferrocenylprop-2-enylidene)rhodanine, and
1,3-diethyl-5(ferrocenylpenta-2,4-dienylidene) thio-
   barbituric acid.

The subject light-sensitive ferrocene dyes are conveniently prepared by condensing formylferrocene or a suitable vinylog thereof, usually having from 1 to 2 vinylene radicals, with a quaternary salt or other reagent to prepare the composite dyes such as those described above in formulas a to c. In general, formylferrocene or a vinylog of formylferrocene and another reagent such as, for example, 1,2,3 - tetramethylbenzothiazolium iodide, 2-methyl - 4,6 - diphenylpyrylium fluoroborate, 1,3-diethylthiobarbituric acid, etc., are co-dissolved in a suitable solvent or solvent mixture and heated to reflux whereupon the dye condensation takes place. After heating, the dye is precipitated by cooling or immersion in a fluid medium in which it is insoluble, and the dye so obtained is then purified such as by filtration, solvent washing, recrystallization or the like method.

The light-sensitive ferrocene dyes of this invention can be admixed with gelatin and this mixture coated on a support material to prepare composite photographic elements. Conventionally, in preparing these elements, the mixture of gelatin and ferrocene dye is coated, such as by immersion, flow coating, brushing, doctor-blade coating and the like onto a support such as conventional, photographic film base materials like cellulose esters including cellulose acetate, cellulose nitrate, cellulose acetate butyrate, etc., poly-$\alpha$-olefins such as polyethylene and polypropylene, polyester like poly(ethylene terephthalate) as well as metals such as zinc and aluminum and paper including polyethylene and polypropylene coated paper. Other support materials that are suitably used are known in the art. In the sensitized gelatin layers, the gelatin-ferrocene dye mixture generally contains a weight ratio of from about 2 to 6 parts of gelatin per part of dye with, for example, from about 50 mg./ft.$^2$ to about 200 mg./ft.$^2$ ferrocene dye being generally used. More widely varying ratios and amounts can be used if desired.

A photographic element having a support on which is coated a layer including gelatin and a light- or heat-sensitive ferrocene dye such as those described elsewhere herein, can be advantageously utilized in a wide variety of photographic processes to prepare negative or positive image reproductions. Upon an imagewise exposure, the subject gelatin layers are hardened or tanned in the areas impinged upon by activating visible light radiation, rendering the tanned gelatin substantially hydrophobic in character. Such tanning of gelatin is not initiated by irradiation with light from the ultraviolet portion of the spectrum. Upon exposure, the light-sensitive ferrocene dyes are converted from their initially highly colored state to a nearly colorless or pale yellow insoluble product. Certain higher vinylogs of the subject dyes (wherein $n$ is either 2 or 3) are sensitive to infrared radiation and to heat rays.

In one aspect, a suitably imagewise exposed and water moistened element of this invention is advantageous as a planographic printing master. The exposed, hardened gelatin areas are rendered substantially hydrophobic in character and accept greasy printing inks of the type used in lithographic reproduction processes, whereas the unexposed areas are still hydrophilic in nature, adsorb water and repel such greasy inks. In such a fashion, negative images can be prepared by lithographic means.

In another aspect, an imagewise exposed element can first be treated with warm water (i.e. at least about 30° C.) which may contain addenda to decrease adhesion of the gelatin layer to the support in unexposed areas after which the unexposed gelatin can be transferred, such as by contact transfer, to another support material to provide positive images. Image definition can be enhanced by including within the gelatin layer a dyestuff colorant additional to the light-sensitive ferrocene dye.

In yet another aspect, an imagewise exposed photographic element can be treated with a warm water wash to remove unexposed, unhardened gelatin, leaving on the support an imagewise exposed pattern of tanned gelatin. This pattern provides a raised, relief surface which is advantageous as a relief printing master to transfer either printing inks or dyes such as those employed in photographic dye transfer processes and prepare negative images.

Additional such embodiments, utilizing either the differential solubility or imagewise removal of gelatin promoted by suitable light exposures, are susceptible of still wider application in the photographic or photomechanical image reproduction arts. The utility of such elements is especially advantageous in office copying, printing, and graphic arts proof plate situations.

The following examples are included for a further understanding of the invention.

EXAMPLE 1

Preparation of 3 - ethyl-2-ferrocenylidenemethylbenzothiazolium-p-toluene sulfonate. Under dark conditions, a mixture containing:

| | |
|---|---|
| formylferrocene | 2.149 |
| 2-methyl - 3 - ethylbenzothiazolium p-toluene sulfonate | 7.09 |
| ethanol | 5.09 |
| triethylamine | 2.09 | is heated at reflux for a period of 30 minutes. The solvent is then removed, after which the residue is boiled in about 30 ml. acetone, filtered and poured into 300 ml. dry ether. After decanting the ether and redissolving the resulting oil in 30 ml. acetone, the material is again filtered, after which the filtrate is poured slowly into 300 ml. dry ether. The solid material is filtered out and dried and is then crystallized from a 1:1 ethanol-water mixture, whereupon it forms deep blue lustrous plates, M.P. 148–150° C., as the monohydrate.

*Analysis.*—Calculated (percent): C, 59.7; H, 5.2; Fe, 9.9. Found (percent): C, 61.3/61.6; H, 5.2/5.5; Fe, 10.1.

EXAMPLE 2

Using the procedures of Example 1, the following dyes are prepared by condensing formylferrocene with appropriate quaternary salts as are summarized in the following table.

| | Quaternary salt | Resultant ferrocene dye | Dye hue (in solution) |
|---|---|---|---|
| 1 | 1-methylpyridinium-p-toluene sulfonate | 1-methyl-2-ferrocenylidenemethylpyridinium-p-toluene sulfonate | Magenta. |
| 2 | 3-methyl-4,5-dihydrothiazolium iodide | 3-methyl-2-ferrocenylidenemethyl-4,5-dihydrothiazolium iodide | Do. |
| 3 | 3-methylbenzothiazolium-p-toluene sulfonate | 3-methyl-2-ferrocenylidenemethylbenzothiazolium-p-toluene sulfonate | Blue. |
| 4 | Benzothiazolium-3-butylsulfate | 2-ferrocenylidenebenzothiazolium-3-butylsulfate | Blue. |
| 5 | 1,3,3-trimethylbenz[e]indolium iodide | 1,3,3-trimethyl-2-ferrocenylidenemethylbenz[e]indolium iodide | Green. |
| 6 | 3-methylbenzothiazolium iodide | 3-methyl-2-ferrocenylidenemethylbenzothiazolium iodide | Blue. |
| 7 | 3-($\beta$-carboxyethyl)benzothiazolium iodide | 3-($\beta$-carboxyethyl)-2-ferrocenylidenemethylbenzothiazolium iodide | Blue. |

EXAMPLE 3

Using the procedure of Example 1, the dye 1-ethyl-2-ferrocenylpenta-2,4-dienylidenemethyl - 3,3 - dimethyl-$\alpha$-naphth[e]indolium-p-toluene sulfonate is prepared by reacting 1-ethyl - 2,3,3-trimethyl-$\alpha$-naphth[e]indolium p-toluene sulfonate and formylbuta-1,3-dienylferrocene.

EXAMPLE 4

Preparation of 2,4-diphenyl-6-($\beta$-ferrocenylidenevinyl)pyrylium fluoroborate. Under dark conditions, a mixture containing:

2-methyl-4,6-diphenylpyrylium fluoroborate—3.34 g.
Formylferrocene—2.34 g.
Acetic anhydride—30 ml.

is heated at reflux for 5 minutes, cooled and poured into 300 ml. dry ether, after which the residue is filtered out and recrystallized from 100 ml. methanol, M.P. 233–4° C. with decomposition.

*Analysis.*—Calculated (percent): C, 65.7; H, 4.4; Fe, 10.5. Found (percent): C, 66.0; H, 4.6; Fe, 10.3.

EXAMPLE 5

Preparation of 1,3 - diethyl - 5-ferrocenylidene-2-thiobarbituric acid. Under dark conditions, 2.0 g. 1,3-diethyl-2-thiobarbituric acid is dissolved in 10 ml. ethanol and this solution is then added to a solution of 2.14 g. formylferrocene in 10 ml. ethanol. The resultant solution is heated to reflux and then cooled, after which the dye is filtered off, washed with ethanol and dried to form dark, lustrous blue plates (3.7 g.) M.P. 183–4° C.

*Analysis.*—Calculated (percent): C, 57.5; H, 5.3; Fe, 14.0; N, 7.1. Found (percent): C, 57.7; H, 5.1; Fe, 13.6; N, 7.0.

EXAMPLE 6

Preparation of 3 - ethyl - 5 - ferrocenylidenerhodanine. Under dark conditions, a mixture containing:

3-ethylrhodanine—1.61 g.
Formylferrocene—2.14 g.
Ethanol—20 ml.
Piperidine—5 drops is heated at reflux for 5 minutes and then cooled, after which the dye is filtered off and washed with absolute ethyl alcohol, M.P. 192–3° C.

*Analysis.*—Calculated (percent): C, 53.6; H, 4.5; Fe, 15.5; N, 3.9. Found (percent): C, 54.0; H, 4.2; Fe, 15.6; N, 3.7.

EXAMPLE 7

Preparation of 5 - ferrocenylidene-3-($\beta$-sulfoethyl)rhodanine sodium salt. Under dark conditions, 1.4 g. $\beta$-sulfoethylrhodanine sodium salt is dissolved in 10 ml. $H_2O$ and this solution is added to 5 ml. ethanol after which is also added 1.17 g. formylferrocene, 15 ml. pyridine and 3 drops piperidine. The resultant solution is heated at reflux for 5 minutes, after which it is then cooled, drowned in ether, filtered and dried. The residue is then partially dissolved in ethanol and added to an ethanolic solution of 1.5 equivalents sodium iodide, stirred, cooled, filtered, washed in ether and dried, yielding a crude dye which is then recrystallized from a 3:1 ethanol-water solution.

*Analysis.*—Calculated (percent): C, 41.7; H, 3.3; Fe, 12.1; N, 3.0. Found (percent): C, 41.4; H, 3.5; Fe, 12.0; N, 2.9.

EXAMPLE 8

Preparation of 2-phenylimino - 3 - cetyl-5-ferrocyenylidene-4-thiazolidone. Under dark conditions a mixture containing:

2-phenylimino-3-cetyl-4-thiazolidone—4.16 g.
Formylferrocene—2.34 g.
Piperidine—1.0 ml.
Methanol—50 ml.

is heated at reflux for 6 hours then allowed to stand at about 20° C. for 2 days, after which the dye is filtered off, washed with methanol, dried and recrystallized from ethyl alcohol, yielding red plates, M.P. 79–80° C.

*Analysis.*—Calculated (percent): C, 70.5; H, 7.9; Fe, 9.1; N, 4.6. Found (percent): C, 69.9; H, 8.0; Fe, 8.6; N, 4.5.

EXAMPLE 9

Four light-sensitive elements are prepared as follows. Three sections of cellulose acetate support material are coated with a common solution of 5% gelatin (aqueous) and an ethylalcohol-polyethylene glycol solution of a light-sensitive ferrocene dye, such that the resultant coated coverages are gelatin—250 mg./ft.$^2$; ferrocene dye—80 mg./ft.$^2$; and polyethylene glycol—500 mg./ft.$^2$. in element 1 the ferrocene dye is that of Example 1; in element 2 the dye is dye 6 of Example 2; in element 3 the dye is that of Example 3, and in element 4 the dye is that of Example 5. After coating and drying, a portion of each of elements 1, 2 and 4 is exposed for 4 minutes to the light of a number 2 tungsten photoflood lamp held at a distance of 6 inches from the exposure plane, the exposure being through a .3 log E neutral density step tablet and a compensating filter (model 2B Wratten, marketed by the Eastman Kodak Company). A portion of element 3 is heated to 150° C. for 1 minute for a suitable activating exposure. The exposed elements are then processed by washing for 3 minutes in water held at a temperature of 55° C. whereupon a gelatin relief image in proportion to the exposure is present on the support of each element. The remaining portions of each of the 4 elements are exposed for 5 minutes to the ultraviolet rays of 14, 15 watt black light fluorescent tubes held at a distance of 3 inches from the exposure plane. No tanning of gelatin occurs as a result of this ultraviolet exposure.

EXAMPLE 10

A .5 g. portion of the dye, 1,3,3-trimethyl-2-ferrocenylidenebenz[e]indolium iodide is dissolved in 5 ml. ethyl alcohol and 5 ml. polyethylene glycol. To this solution is then added 40 ml. of a 5% gelatin, 1 ml. of saponin as a spreading agent and 2 ml. of Formalin as a gelatin hardening agent, after which the composite solution is coated at a .006 inch wet thickness onto a cellulose acetate support to prepare 2 composite light-sensitive elements having a ferrocene dye coverage of 88 mg./ft.$^2$ and a gelatin coverage of 350 mg./ft.$^2$. A third element is prepared in like fashion, except that the Formalin hardening agent is omitted from the coating solution and the light-sensitive ferrocene dye, 1,3,3-trimethyl-2-(2-ferrocenylvinyl)indolium iodide, is employed in lieu of any other ferrocene dye. Coating 1 is then exposed to the light of a (500 watt) R–2 photoflood lamp held at a distance of 9 inches from the exposing plane, the exposure being through a standard .3 log E density step wedge plus a 1.0 cyan colored compensating filter. Subsequent to exposure the element is developed by immersion for 1 minute in each of three successive 55° C. water baths, after which the element is dried to produce a hardened gelatin image which is a negative reproduction of the original step wedge. A dye-transfer image is then obtained by immersing the processed element for 3 minutes in a cyan colored dye transfer dyestuff, after which the element is rinsed for 1 minute in a 1% aqueous acetic acid solution containing 5 ml. of 1% aqueous sodium acetate. The imbided, dyed relief image is then transferred to a dye accepting, mordanted dye transfer paper by surface contact for 3 minutes. The dye transfer steps are repeated several times producing images of equal quality. In a like fashion, coatings 2 and 3 are processed and utilized to prepare dye-transfer images and similar results are obtained. The processed element 3 exhibits a different relief image color from those of elements 1 and 2 due to the use of a different ferrocene dye.

The invention has been described in detail with particular reference to certain preferred embodiments thereof, but it will be understood that variations and modifications can be effected within the spirit and scope of the invention.

I claim:
1. A process for preparing a printing plate, said process comprising:
  (A) imagewise exposing to visible light radiation a photographic element comprising a support having coated thereon a photosensitive composition comprising gelatin and a light-sensitive ferrocene dye and tanning gelatin in areas of exposure, said ferrocene dye having a formula selected from:

(I) 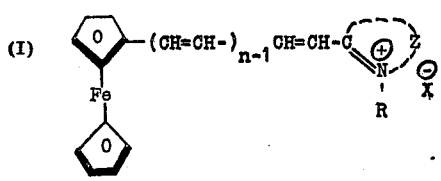

(II) 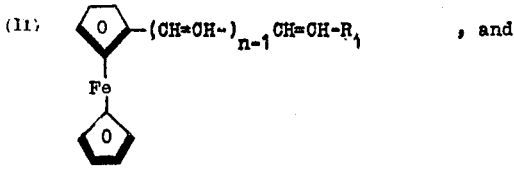 , and (III) 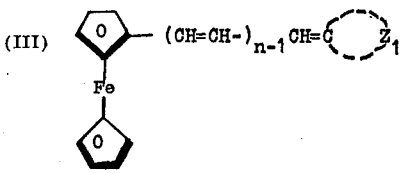

wherein:

(a) Z represents the non-metallic atoms necessary to complete a heterocyclic nucleus selected from the group consisting of a pyridine nucleus, an indole nucleus, a thiazole nucleus, an oxazole nucleus, a selenazole nucleus, an imidazole nucleus, and a quinoline nucleus, (b) $\overset{\ominus}{X}$ represents an anion, (c) R represents an alkyl radical having from 1 to 6 carbon atoms in the alkyl chain, (d) $R_1$ represents a member selected from the group consisting of a 2-pyrylium salt radical, a 4-pyrylium salt radical, a 4-thiopyrylium salt radical and a 2-thiapyrylium salt radical, (e) $Z_1$ represents the non-metallic atoms necessary to complete a 5 to 6 membered saturated heterocyclic nucleus selected from the group consisting of a rhodanine nucleus, a thiazolidone nucleus, and a 1,3-dialkyl-2-thiobarbituric acid nucleus wherein the vinylidene radical is substituted at the 5-position of the acid saturated heterocyclic nucleus, (f) n represents an integer of from 1 to 3, and (B) treating the resulting imagewise exposed photographic element with water to produce a composite printing plate for image reproduction.

2. A photosensitive composition comprising gelatin and a light-sensitive ferrocene dye having a formula selected from:

(I) 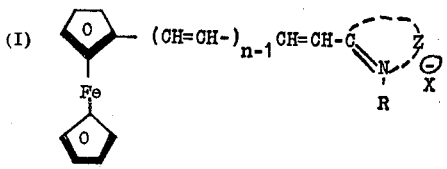

(II) 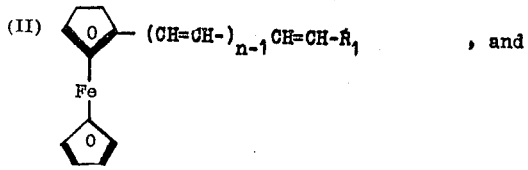 , and (III) 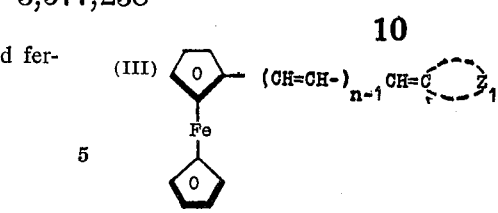

wherein:

(a) Z represents the non-metallic atoms necessary to complete a heterocyclic nucleus selected from the group consisting of a pyridine nucleus, an indole nucleus, a thiazole nucleus, an oxazole nucleus, a selenazole nucleus, an imidazole nucleus and a quinoline nucleus, (b) $\overset{\ominus}{X}$ represents an acid anion, (c) R represents an alkyl radical having from 1 to 6 carbon atoms in the alkyl chain, (d) $R_1$ represents a member selected from the group consisting of a 2-pyrylium salt radical, a 4-pyrylium salt radical, a 2-thiapyrylium salt radical and a 4-thiapyrylium salt radical, (e) $Z_1$ represents the non-metallic atoms necessary to complete a 5 to 6 membered saturated heterocyclic nucleus selected from the group consisting of a rhodanine nucleus, a thiazolidone nucleus, and a 1,3-dialkyl-2-thiobarbituric acid nucleus wherein the vinylene radical is substituted at the 5-position of the saturated heterocyclic, and (f) n represents an integer of from 1 to 3.

3. A photosensitive composition as described in claim 2 wherein the gelatin comprises from 2 to about 6 parts by weight per part of light-sensitive ferrocene dye.

4. A photographic element comprising a support having coated thereon a photosensitive composition comprising gelatin and a light-sensitive ferrocene dye having a formula selected from:

(I) 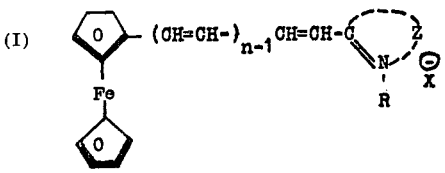

(II) 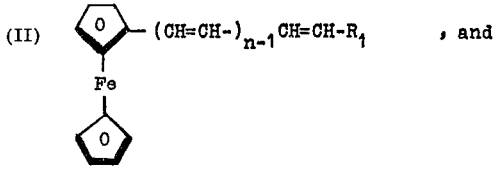 , and (III) 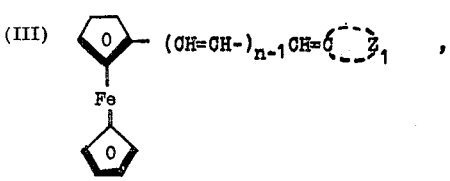 , wherein:

(a) Z represents the non-metallic atoms necessary to complete a heterocyclic nucleus selected from the group consisting of a pyridine nucleus, an indole nucleus, a thiazole nucleus, an oxazole nucleus, a selenazole nucleus, an imidazole nucleus and a quinoline nucleus, (b) $\overset{\ominus}{X}$ represents an acid anion, (c) R represents an alkyl radical having from 1 to 6 carbon atoms in the alkyl chain, (d) $R_1$ represents a member selected from the group consisting of a 2-pyrylium salt radical, a 4-pyrylium salt radical, a 2-thiapyrylium salt radical and a 4-thiapyrylium salt radical, (e) $Z_1$ represents the non-metallic atoms necessary to complete a 5 to 6 membered saturated heterocyclic nucleus selected from the group consisting of a rhodanine nucleus, a thiazolidone nucleus, and a 1,3-dialkyl-2-thiobarbituric acid nucleus wherein the vinylene radical is substituted at the 5-position of the saturated heterocyclic nucleus, and (f) $n$ represents an integer of from 1 to 3.

5. A photographic element comprising a support having coated thereon a photosensitive composition comprising gelatin and a light-sensitive ferrocene dye having the formula:

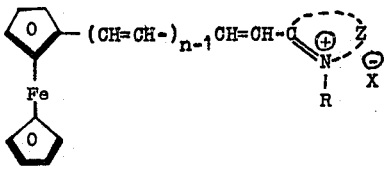

wherein:
(a) Z represents the non-metallic atoms necessary to complete a heterocyclic nucleus selected from the group consisting of a pyridine nucleus, the thiazole nucleus, a benzothiazole nucleus and a benz[e]indole nucleus, (b) $\overset{\ominus}{X}$ represents an anion selected from the group consisting of an iodide anion, a bromide anion, a chloride anion, a p-toluene sulfonate anion, a methylsulfonate anion and a perchlorate anion, (c) R represents an alkyl radical having from 1 to 4 carbon atoms in the alkyl chain, and (d) $n$ represents an integer of from 1 to 3.

6. A photographic element comprising a support having coated thereon a photosensitive composition comprising gelatin and a light-sensitive ferrocene dye having the formula:

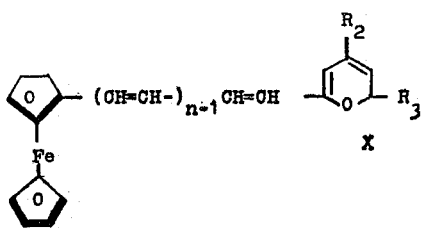

wherein:
(a) each of $R_2$ and $R_3$ represents an aryl radical, (b) $\overset{\ominus}{X}$ represents an anion, and (c) $n$ represents an integer of from 1 to 3.

7. A photographic element comprising a support having coated thereon a photosensitive composition comprising gelatin and a light-sensitive ferrocene dye having the formula:

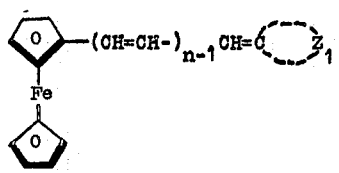

wherein:
(a) $n$ represents an integer of from 1 to 3, (b) $Z_1$ represents the non-metallic atoms necessary to complete a saturated heterocyclic nucleus having a formula selected from the group consisting of:

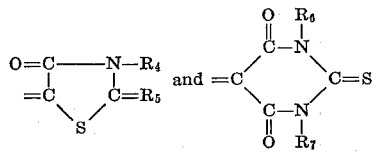

wherein:
(c) $R_4$ represents an alkyl radical having from 1 to about 16 carbon atoms, (d) $R_5$ represents a radical selected from the group consisting of a thioxo radical and an arylimino radical, and (e) each of $R_6$ and $R_7$ represents an alkyl radical having from 1 to about 6 carbon atoms in the alkyl chain.

8. A photographic element as described in claim 4, wherein the ferrocene dye is coated at a coverage of from about 50 mg./ft.$^2$ to about 200 mg./ft.$^2$.

9. A photographic element comprising a support having coated thereon a photosensitive composition comprising gelatin and a light-sensitive ferrocene dye selected from the group consisting of:

3-ethyl-2-ferrocenylidenemethylbenzothiazolium-p-toluene sulfonate,
1-methyl-2-ferrocenylidenemethylpyridinium-p-toluene sulfonate,
3-methyl-2-ferrocenylidenemethyl-4,5-dihydrothiazolium iodide,
3-methyl-2-ferrocenylidenemethylbenzothiazolium-p-toluene sulfonate,
2-ferrocenylidenebenzothiazolium-3-butyl-sulfate,
1,3,3-trimethyl-2-ferrocenylidenemethylbenz[e]indolium iodide,
3-methyl-2-ferrocenylidenemethylbenzothiazolium iodide,
3-($\beta$-carboxyethyl)-2-ferrocenylidenemethylbenzothiazolium iodide,
2,4-diphenyl-6-($\beta$-ferrocenylidenevinyl)pyrylium fluoroborate,
1,3-diethyl-5-ferrocenylidene-2-thiobarbituric acid,
3-ethyl-5-ferrocenylidenerhodanine,
5-ferrocenylidene-3-($\beta$-sulfoethyl)rhodanine sodium salt,
2-phenylimino-3-cetyl-5-ferrocenylidene-4-thiazolidone.

References Cited

UNITED STATES PATENTS

| | | | |
|---|---|---|---|
| 3,335,008 | 8/1967 | Dubosc | 96—92X |
| 3,423,206 | 1/1969 | Hackmann | 96—48 |
| 3,446,621 | 5/1969 | Hackmann et al. | 96—49 |
| 3,489,568 | 1/1970 | Hackmann et al. | 96—92X |
| 3,490,907 | 1/1970 | Schenck et al. | 96—92 |

FOREIGN PATENTS

| | | | |
|---|---|---|---|
| 1,466,079 | 12/1966 | France | 96—92 |

OTHER REFERENCES

Kosar, J., "Light-Sensitive Systems," 1965, pp. 39–40.

NORMAN G. TORCHIN, Primary Examiner

C. L. BOWERS, JR., Assistant Examiner

U.S. Cl. X.R.

96—33, 36, 36.3, 49, 92, 115